United States Patent
Manabe

(10) Patent No.: US 12,275,310 B2
(45) Date of Patent: Apr. 15, 2025

(54) ELECTRIC VEHICLE CONTROL METHOD AND SYSTEM FOR SWITCHING DRIVE CONTROL ON MOTORS

(71) Applicants: NISSAN MOTOR CO., LTD., Yokohama (JP); AMPERE S.A.S., Boulogne-Billancourt (FR)

(72) Inventor: Tomoyuki Manabe, Kanagawa (JP)

(73) Assignees: NISSAN MOTOR CO., LTD., Yokohama (JP); AMPERE S.A.S., Boulogne-Billancourt (FR)

( * ) Notice: Subject to any disclaimer, the term of this patent is extended or adjusted under 35 U.S.C. 154(b) by 178 days.

(21) Appl. No.: 17/927,960

(22) PCT Filed: May 29, 2020

(86) PCT No.: PCT/IB2020/000515
§ 371 (c)(1),
(2) Date: Nov. 28, 2022

(87) PCT Pub. No.: WO2021/240193
PCT Pub. Date: Dec. 2, 2021

(65) Prior Publication Data
US 2023/0241982 A1     Aug. 3, 2023

(51) Int. Cl.
*B60L 15/20*      (2006.01)
*B60L 9/18*       (2006.01)

(52) U.S. Cl.
CPC .......... *B60L 15/2036* (2013.01); *B60L 9/18* (2013.01); *B60L 2240/421* (2013.01); *B60L 2240/423* (2013.01); *B60L 2240/526* (2013.01)

(58) Field of Classification Search
None
See application file for complete search history.

(56) References Cited

U.S. PATENT DOCUMENTS

| | | | | |
|---|---|---|---|---|
| 9,242,642 | B2 * | 1/2016 | Hayashi | B60L 15/2054 |
| 2008/0000700 | A1 * | 1/2008 | Kotani | B60K 6/365 123/436 |
| 2014/0297085 | A1 | 10/2014 | Hayashi et al. | |
| 2017/0021733 | A1 * | 1/2017 | Kondou | H03K 17/145 |

FOREIGN PATENT DOCUMENTS

| | | | |
|---|---|---|---|
| JP | 2002-019482 | A | 1/2002 |
| JP | 2011-231854 | A | 11/2011 |
| JP | 2016-210358 | A | 12/2016 |
| JP | 6485202 | B2 | 3/2019 |

* cited by examiner

*Primary Examiner* — James J Lee
*Assistant Examiner* — Jonathan E Reinert
(74) *Attorney, Agent, or Firm* — Foley & Lardner LLP

(57) ABSTRACT

An electric vehicle control method including using a first motor and a second motor as travel drive sources, performing drive control on the first motor by transmitting a first torque command value to a first inverter, and performing drive control on the second motor by transmitting a second torque command value to a second inverter, and performing switching control of switching, based on a required drive force, the drive control on the second motor by the second inverter between an ON state in which the drive control is performed and an OFF state in which the drive control is stopped, wherein a torque fluctuation amount generated in the second motor during the switching control is calculated based on a rotation speed of the second motor, and the first torque command value is corrected based on the torque fluctuation amount.

8 Claims, 10 Drawing Sheets

ELECTRIC VEHICLE CONTROL METHOD AND SYSTEM FOR SWITCHING DRIVE CONTROL ON MOTORS

TECHNICAL FIELD

The present invention relates to an electric vehicle control method and an electric vehicle control system.

BACKGROUND ART

JP6485202B discloses a technique in which, in an electric vehicle including a front-wheel drive motor and a rear-wheel drive motor, one of the front-wheel driving motor and the rear-wheel driving motor is stopped according to a required drive force, and the electric vehicle is driven by the other driving motor.

SUMMARY OF INVENTION

However, JP6485202B provides a configuration in which a clutch is provided between the motor and a drive wheel, and switching control is performed so as not to connect the clutch on a side where driving is stopped, and therefore, a torque discontinuity is generated when the clutch is switched between connection and disconnection.

Therefore, an object of the present invention is to provide an electric vehicle control method and an electric vehicle control device that reduce a torque discontinuity at the time of switching a driving state.

An electric vehicle control method according to one embodiment of the present application is an electric vehicle control method including using a first motor and a second motor as travel drive sources, performing drive control on the first motor by transmitting a first torque command value to a first inverter, and performing drive control on the second motor by transmitting a second torque command value to a second inverter, and performing switching control of switching, based on a required drive force, the drive control on the second motor by the second inverter between an ON state in which the drive control is performed and an OFF state in which the drive control is stopped, wherein a torque fluctuation amount generated in the second motor during the switching control is calculated based on a rotation speed of the second motor, and the first torque command value is corrected based on the torque fluctuation amount.

DESCRIPTION OF EMBODIMENTS

Hereinafter, embodiments of the present invention will be described.

<Configuration of Electric Vehicle System>

Figure 1:
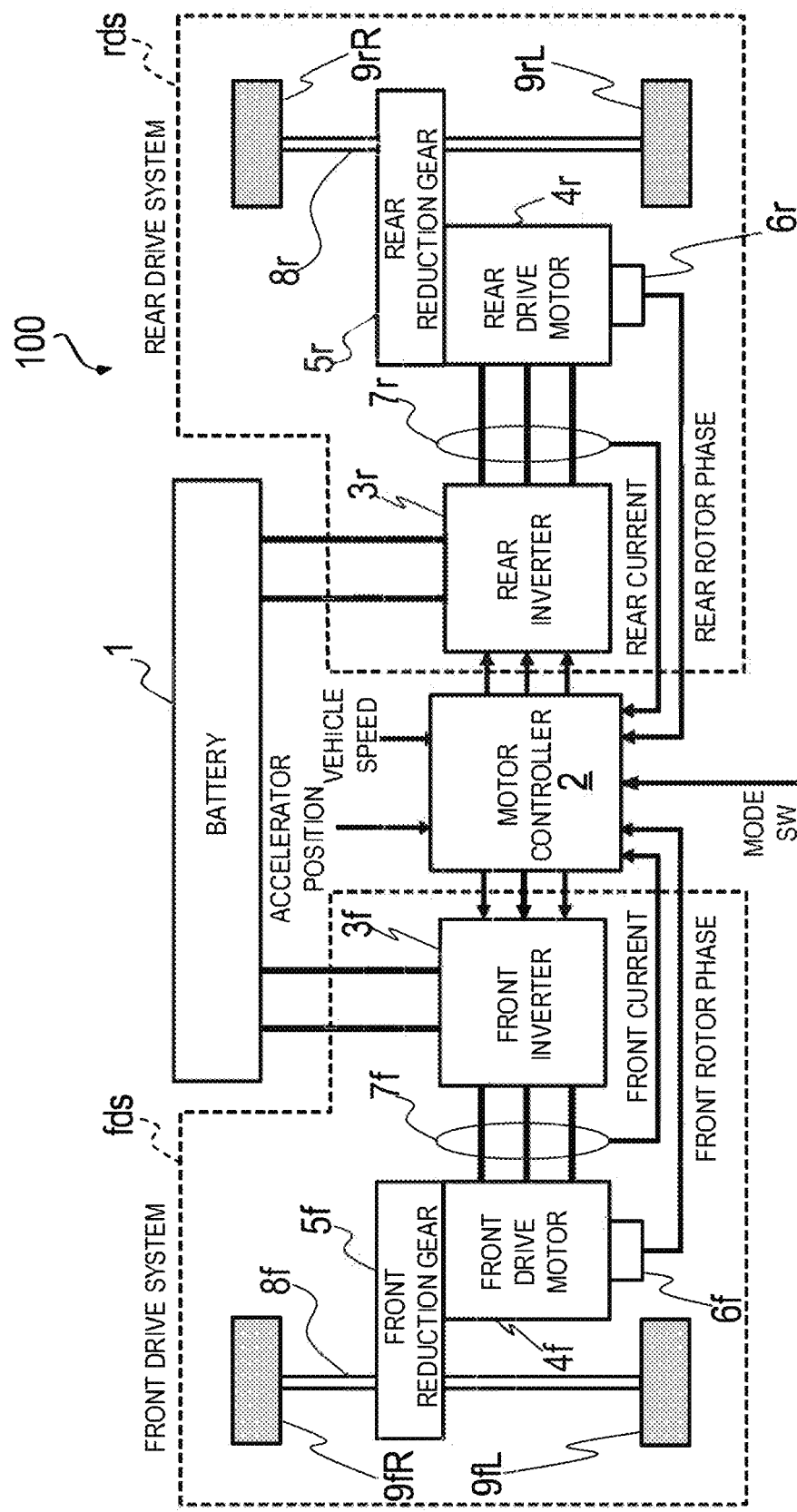
FIG. 1 is a block diagram illustrating a basic configuration of an electric vehicle system to which an electric vehicle control method according to the present embodiment is applied.

FIG. 1 is a block diagram illustrating a main configuration of an electric vehicle system 100 to which an electric vehicle control method (control system) according to the present embodiment is applied.

The electric vehicle according to the present embodiment is an automobile that includes a drive motor 4 (electric motor) as a drive source of the vehicle and is capable of traveling by a drive force of the drive motor 4. Examples of the electric vehicle according to the present embodiment includes an electric vehicle and a hybrid vehicle. In particular, the electric vehicle system 100 according to the present embodiment to be applied to the electric vehicle includes two drive motors 4 (a front drive motor 4f and a rear drive motor 4r). Hereinafter, the configuration of the electric vehicle system 100 will be described in more detail.

As illustrated in FIG. 1, the electric vehicle system 100 includes a front drive system fds, a rear drive system rds, a battery 1, and a motor controller 2 (control unit).

The front drive system fds is provided with various sensors and actuators for controlling the front drive motor 4f that drives front drive wheels 9f (a left front drive wheel 9fL and a right front drive wheel 9fR).

On the other hand, the rear drive system rds is provided with various sensors and actuators for controlling the rear drive motor 4r that drives rear drive wheels 9r (a left rear drive wheel 9rL and a right rear drive wheel 9rR).

The front drive system fds and the rear drive system rds are individually controlled by the motor controller 2.

The battery 1 functions as a power source that supplies (discharges) drive power to the drive motors 4 (the front drive motor 4f and the rear drive motor 4r), and is connected to inverters 3 (a front inverter 3f and a rear inverter 3r) so as to be charged by receiving a supply of regenerative power from the drive motors 4 (the front drive motor 4f and the rear drive motor 4r).

The motor controller 2 is, for example, a computer including a central processing unit (CPU), a read only memory (ROM), a random access memory (RAM), and an input/output interface (I/O interface). The motor controller 2 is a component constituting an electric vehicle control device according to the present invention, and including a program for executing the electric vehicle control method according to the present invention Signals of various vehicle variables indicating vehicle states, such as an accelerator position APO, a vehicle speed V, rotor phases α (a front rotor phase of and a rear rotor phase $α_r$) of the drive motors 4, and currents Im (a front motor current Imf and a rear motor current Imr) of the drive motors 4, are input as digital signals to the motor controller 2. A signal from a mode switch that determines a traveling mode of the vehicle is input to the motor controller 2 based on an operation of a driver. Examples of the traveling mode include a 2WD mode in which only the rear drive motor 4r (or the front drive motor 4f) is driven, a 4WD mode in which the front drive motor 4f and the rear drive motor 4r are constantly driven, and a switching mode in which switching control is performed between the 2WD mode and the 4WD mode based on the vehicle state.

The motor controller 2 generates a PWM signal for controlling each of the drive motors 4 based on a received signal. In addition, a drive signal for each of the inverters 3 is generated according to the generated PWM signal.

Each of the inverters 3 includes two switching elements (for example, power semiconductor elements such as IGBT or MOS-FET) provided corresponding to each phase. In particular, each of the inverters 3 turns on/off the switching elements in response to a command from the motor controller 2, thereby converting a direct current/alternating current supplied from the battery 1 into a direct current/alternating current, and adjusting a current supplied to each of the drive motors 4 to a desired value.

Each of the drive motors 4 is implemented as a three-phase AC motor. Each of the drive motors 4 (the front drive motor 4f and the rear drive motor 4r) generates a drive force by the alternating current supplied from the corresponding inverter 3 (the front inverter 3f or the rear inverter 3r), and transmits the drive force to each of the drive wheels 9 (the front drive wheels 9f and the rear drive wheels 9r) via a corresponding reduction gear 5 (a front reduction gear 5f or a rear reduction gear 5r) and a corresponding drive shaft 8 (a front drive shaft 8f or a rear drive shaft 8r).

The drive motor 4 generates regenerative power when the drive motor 4 is rotated together with the drive wheels 9 during traveling of the vehicle, thereby recovering kinetic energy of the vehicle as electric energy. In this case, the inverter 3 converts an alternating current (regenerative power) generated during a regenerative operation into a direct current and supplies the direct current to the battery 1.

Here, it is preferable to apply a winding field type motor as the drive motor 4. The inverter 3 is preferably configured to perform switching control on a current flowing through a field winding of a rotor of the drive motor 4. For example, when switching is stopped with respect to a current flowing through a stator winding in a state where the current flows through the field winding of the rotor of the drive motor 4, a negative torque is generated due to a magnetic flux generated by the field winding. However, with the above-mentioned configuration, it is possible to avoid generation of the negative torque due to the magnetic flux.

Rotation sensors 6 (a front rotation sensor 6f and a rear rotation sensor 6r), which are angular velocity detection units (executing an angular velocity detection step), respectively detect the rotor phases α (the front rotor phase $α_f$ and the rear rotor phase $α_r$) of the drive motors 4, and output the rotor phases α to the motor controller 2. The rotation sensors 6 include, for example, a resolver and an encoder.

Current sensors 7 (a front current sensor 7f and a rear current sensor 7r) respectively detect three-phase alternating currents (iu, iv, and iw) flowing through the corresponding drive motor 4. Since the sum of the three-phase alternating currents (iu, iv, and iw) is zero, currents of any two phases may be detected by the current sensor 7, and the current of the remaining one phase may be obtained by calculation. In particular, the current sensor 7 detects three-phase alternating currents ($iu_f$, $iv_f$, and $iw_f$) which are currents flowing through the front drive motor 4f, and three-phase alternating currents ($iu_r$, $iv_r$, and $iw_r$) which are currents flowing through the rear drive motor 4r.

Figure 2:
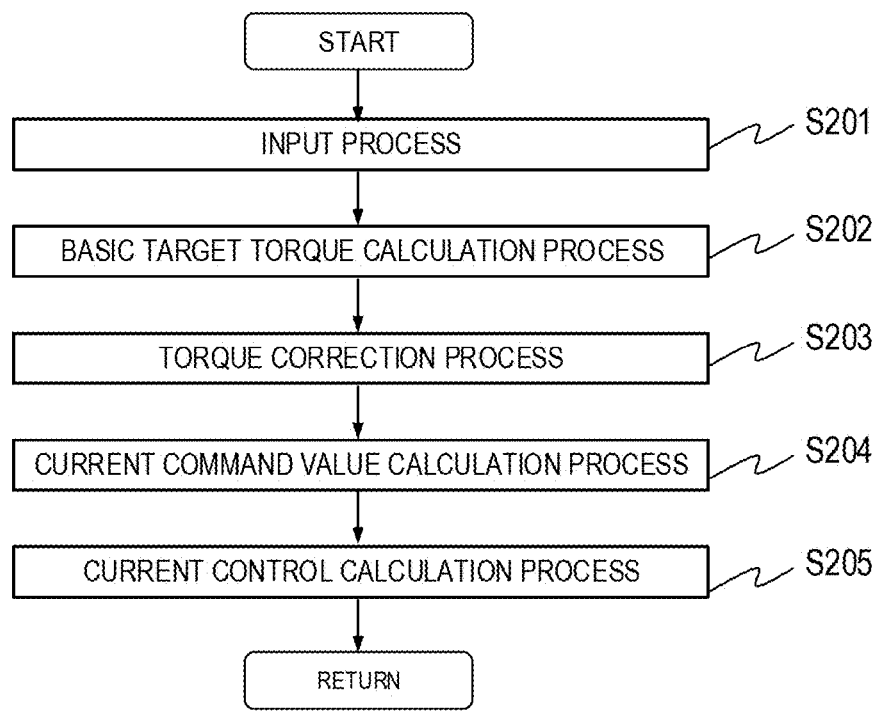
FIG. 2 is a flowchart illustrating main processes of drive control for the electric vehicle.

FIG. 2 is a flowchart illustrating a basic process in the electric vehicle control device by the motor controller 2 according to the present embodiment. The motor controller 2 is programmed to execute processes from step S201 to step S205 illustrated in FIG. 2 at a predetermined calculation cycle.

In step S201, the motor controller 2 executes an input process of acquiring various parameters used for executing processes of step S202 and subsequent steps in accordance with the following processes 1 to 3.

1. Detection Value of Each Sensor

The motor controller 2 acquires, from an accelerator position sensor (not illustrated) and the respective sensors, the accelerator position APO (%), the rotor phase α [rad], the three-phase alternating currents (iu, iv, and iw) [A] flowing through the drive motor 4, and a direct-current voltage value Vdc [V] of the battery 1. In addition, the motor controller 2 acquires a mode switch signal.

2. Previous Value of Motor Torque Command Value

The motor controller 2 acquires previous values of later-described motor torque command values (a front motor torque command value Tmf and a rear motor torque command value Tmr) stored in an internal memory.

3. Control Parameter Obtained by Calculation

The motor controller 2 calculates a motor electric angular velocity co, [rad/s], a motor rotation speed $ω_m$ [rad/s], a motor rotation speed $N_m$ [rpm], and a wheel speed $ω_w$ [km/h] based on the respective parameters acquired according to the above-mentioned "1.".

(i) Motor Electric Angular Velocity $ω_e$

The motor controller 2 executes time derivative on the rotor phases α (the front rotor phase $α_f$ and the rear rotor phase $α_r$) to obtain the motor electric angular velocities $ω_e$ (a front motor electric angular velocity $ω_{ef}$ and a rear motor electric angular velocity $ω_{er}$).

(ii) Motor Rotation Speed $ω_m$

The motor controller 2 divides the motor electric angular velocity $ω_e$ by a pole pair number of the drive motor 4 to calculate motor rotation speeds $ω_m$ (a front motor rotation speed $ω_{mf}$ and a rear motor rotation speed co.), which are mechanical angular velocities of the drive motors 4. A relationship between the motor rotation speed $ω_m$ and a rotation speed of the drive shaft 8 serving as a drive shaft is appropriately determined according to a gear ratio of the reduction gear 5. That is, the motor rotation speed $ω_m$ is a speed parameter correlated with the rotation speed of the drive shaft 8.

(iii) Motor Rotation Speed $N_m$

The motor controller 2 calculates motor rotation speeds $N_m$ (a front motor rotation speed $N_{mf}$ and a rear motor rotation speed $N_{mr}$) by multiplying the motor rotation speed $ω_m$ by a unit conversion coefficient (60/2π).

(iv) Wheel Speed $ω_w$

First, the motor controller 2 multiplies the front motor rotation speed $ω_{mf}$ by a tire dynamic radius R, and calculates a left front drive wheel speed $ω_{wfL}$ and a right front drive wheel speed $ω_{wfR}$ based on a value obtained by the multiplication and a gear ratio of the front reduction gear 5f. In addition, the motor controller 2 multiplies the rear motor rotation speed $\omega_{mr}$ by the tire dynamic radius R, and calculates a left rear drive wheel speed $\omega_{wrL}$ and a right rear drive wheel speed $\omega_{wrR}$ based on a value obtained by the multiplication and a gear ratio of a final gear of the rear reduction gear 5r. In the present embodiment, the unit conversion coefficient (3600/1000) is applied to each wheel speed $\omega_w$ thus obtained, and a unit [m/s] of the wheel speed $\omega_w$ is converted into [km/h].

The vehicle speed is acquired from a sensor such as a GPS, or is calculated as described above based on the wheel speed by, for example, selecting one of the rotation speeds ($\omega_{mf}$ and $\omega_{mr}$) having a lower rotation speed during acceleration, selecting one of the rotation speeds having a higher rotation speed during deceleration, and selecting any one of the rotation speeds when the vehicle travels at a substantially constant speed.

Next, in step S202, the motor controller 2 calculates a basic target torque requested by the driver based on vehicle information.

Specifically, first, referring to an accelerator position-torque table, the motor controller 2 calculates a first torque target value Tm1 based on the accelerator position APO and the rear motor rotation speed $\omega_{mr}$ (or the front motor rotation speed $\omega_{mf}$) acquired in step S201.

Figure 3:
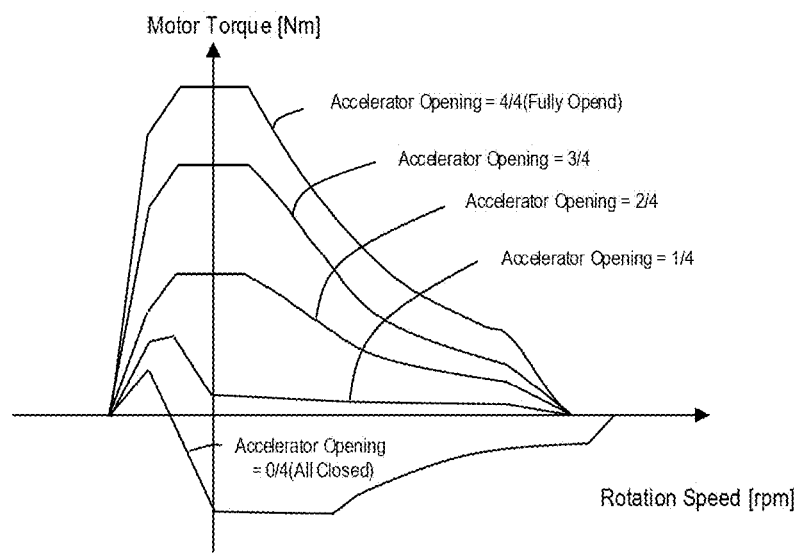
FIG. 3 is a diagram illustrating an example of an accelerator position (accelerator opening degree)-torque table.

FIG. 3 illustrates an example of the accelerator position-torque table referred to by the motor controller 2 according to the present embodiment.

Next, the motor controller 2 calculates, based on the first torque target value Tm1, the front motor torque command value Tmf and the rear motor torque command value Tmr according to, for example, a predetermined front-rear motor torque distribution.

The motor controller 2 obtains the front motor torque command value Tmf and the rear motor torque command value Tmr by, for example, multiplying the first torque target value Tm1 by a front-rear drive force distribution gain Kf ($0 \leq K \leq 1$) and 1-Kf, respectively.

In step S203, the motor controller 2 executes a torque correction process. Details of the torque correction process will be described later.

In step S204, the motor controller 2 executes a current command value calculation process. Specifically, referring to a predetermined table, the motor controller 2 calculates dq-axis current target values ($i_d^*$ and $i_q^*$) based on the front motor torque command value Tmf, the rear motor torque command value Tmr, the front motor rotation speed $\omega_{mf}$, and the rear motor rotation speed $\omega_{mr}$ calculated in step S202 (S203), and the direct-current voltage value Vdc acquired in step S201. In particular, the motor controller 2 calculates front dq-axis current target values ($i_{df}^*$ and $i_{qf}^*$) which are the dq-axis current target values ($i_d^*$ and $i_q^*$) set for the front drive motor 4f, and rear dq-axis current target values ($i_{dr}^*$ and $i_{qr}^*$) which are the dq-axis current target values ($i_d^*$ and $i_q^*$) set for the rear drive motor 4r.

In step S205, the motor controller 2 executes a current control calculation process. Specifically, the motor controller 2 first calculates the dq-axis current values ($i_d$ and $i_q$) based on the three-phase alternating current values (iu, iv, and iw) and the rotor phase a acquired in step S201. Next, the motor controller 2 calculates dq-axis voltage command values ($v_d$ and $v_q$) based on a deviation between the dq-axis current values ($i_d$ and $i_q$) and the dq-axis current target values ($i_d^*$ and $i_q^*$) obtained in step S204. In particular, the motor controller 2 calculates front dq-axis voltage command values ($v_{df}$ and $v_{qf}$) which are the dq-axis voltage command values ($v_d$ and $v_q$) set for the front drive motor 4f, and rear dq-axis voltage command values ($v_{dr}$ and $v_{qr}$) which are the dq-axis voltage command values ($v_d$ and $v_q$) set for the rear drive motor 4r.

Further, the motor controller 2 calculates three-phase alternating voltage command values (vu, vv, and vw) based on the dq-axis voltage command values ($v_d$ and $v_q$) and the rotor phase α. In particular, the motor controller 2 calculates front three-phase alternating voltage command values ($vu_f$, $vv_f$, and $vw_f$) which are the three-phase alternating voltage command values (vu, vv, and vw) set for the front drive motor 4f, and rear three-phase alternating voltage command values ($vu_f$, $vv_f$, and $vw_f$) which are the three-phase alternating voltage command values (vu, vv, and vw) set for the rear drive motor 4r.

The motor controller 2 obtains PWM signals (tu, tv, and tw) [%] based on the calculated three-phase alternating voltage command values (vu, vv, and vw) and the direct-current voltage value Vdc. By turning on and off the switching elements of the inverter 3 according to the PWM signals (tu, tv, and tw) thus obtained, the drive motors 4 (the front drive motor 4f and the rear drive motor 4r) can be driven with a desired torque instructed by a total torque command value (the front motor torque command value Tmf and the rear motor torque command value Tmr).

<Torque Correction Process>

Hereinafter, the torque correction process illustrated in step S203 in FIG. 2 will be described in detail. As described above, the electric vehicle system 100 according to the present embodiment includes a switching mode in which the switching control is performed between the 2WD mode and the 4WD mode based on the vehicle state. As a scene in which the switching control is performed, for example, there is a scene in which the 2WD mode is switched to the 4WD mode when a total torque T exceeds a predetermined value, and the 4WD mode is switched to the 2WD mode when the total torque T is equal to or less than the predetermined value. In addition, when a difference between a vehicle speed estimated from the rear drive motor 4r (or the front drive motor 4f) and the vehicle speed V exceeds a predetermined value, or when a difference between the rear motor rotation speed $\omega_{mr}$ and the rotation speed of the rear drive motor 4r corresponding to the previous value of the rear motor torque command value $T_{mr}$ exceeds a predetermined value, there is a scene in which the 2WD mode is switched to the 4WD mode in order to avoid a slip, and when the difference is equal to or less than the predetermined value, the 4WD mode is switched to the 2WD mode.

On the other hand, the front inverter 3f according to the present embodiment performs the switching control on the current flowing through the field winding provided in the rotor of the front drive motor 4f. When the front inverter 3f does not drive the front drive motor 4f, the front inverter 3f switches the switching control to an OFF state. Thus, the rotor of the front drive motor 4f is switched from a state of being driven by itself to a state of rotating by being driven by the rear drive motor 4r. In addition, when the front inverter 3f drives the front drive motor 4f, the front inverter 3f switches the switching control to an ON state. Thus, the rotor of the front drive motor 4f is switched from a driven state in which the rotor rotates by being driven by the rear drive motor 4r to a driving state in which the rotor is driven by itself.

By switching between the driving state and the driven state of the front drive motor 4f by the switching control performed by the front inverter 3f as described above, a torque discontinuity is generated in the front drive motor 4f, which causes an unpleasant torque shock to the driver. Here, the torque discontinuity is generated by current responsiveness and mechanical inertia (mechanical responsiveness) of the front drive motor 4f and the rear drive motor 4r regardless of magnitudes of the front motor torque command value Tmf and the front motor torque Tf, and the torque discontinuity corresponds to ΔT illustrated in FIG. 4 to be described later.

Therefore, in the torque correction process according to the present embodiment, a torque fluctuation amount corresponding to the torque discontinuity is calculated, and the torque fluctuation amount is reflected in the rear motor torque command value Tmr of the rear drive motor 4r, thereby performing control to reduce or eliminate the torque discontinuity.

<Flow of Torque Correction Process>

Figure 4:
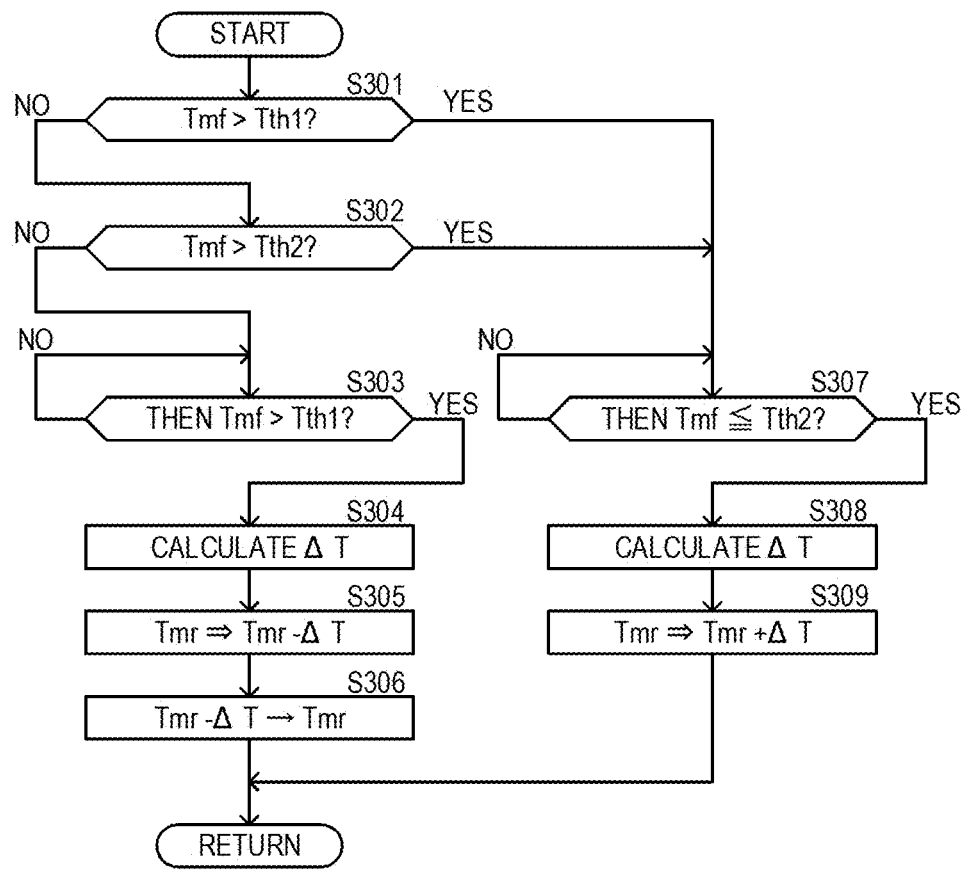
FIG. 4 is a flowchart illustrating a torque correction process for the electric vehicle.
Figure 5:
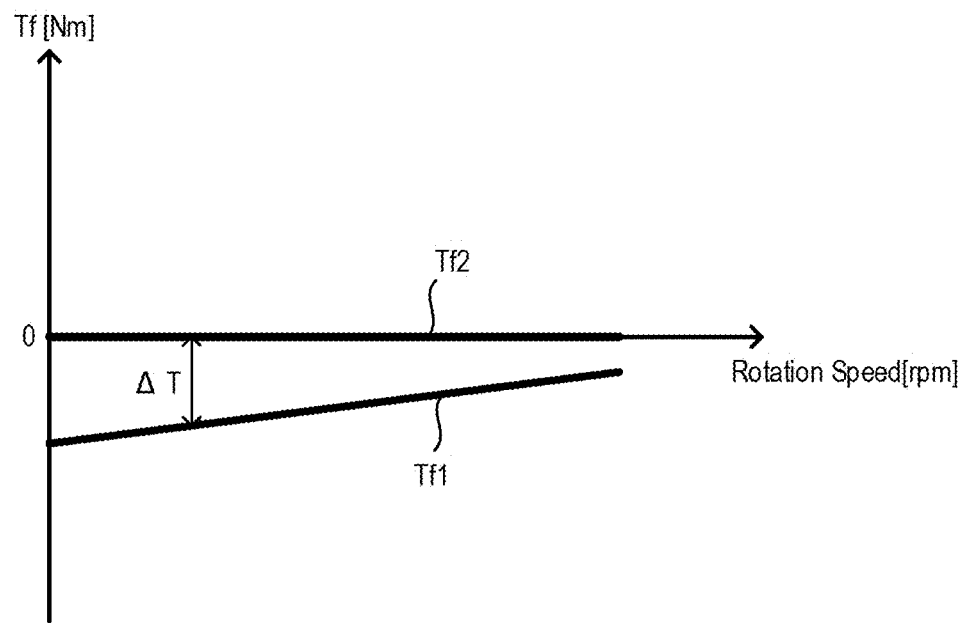
FIG. 5 is a diagram illustrating a relationship between a motor rotation speed and a torque fluctuation amount.

FIG. 4 is a flowchart illustrating the torque correction process of the electric vehicle. FIG. 5 is a diagram illustrating a relationship between the motor rotation speed and the torque fluctuation amount. In the present embodiment, processes of the following steps S301 to S309 are executed at a predetermined cycle.

In step S301, the motor controller 2 determines whether the front motor torque command value Tmf is larger than a first threshold value Tth1, if YES, it is determined that the switching control of the front inverter 3f is in the ON state, and the process proceeds to step S307, and if NO, the process proceeds to step S302. Here, the first threshold value Tth1 is an index for determining whether the switching control of the front inverter 3f has shifted from the OFF state to the ON state, and can be set to, for example, 0 [Nm] or any value larger than 0 [Nm].

In step S302, the motor controller 2 determines whether the front motor torque command value Tmf is larger than a second threshold value Th2, if YES, the process proceeds to step S307, and if NO, it is determined that the switching control of the front inverter 3f is in the OFF state, and the process proceeds to step S303. Here, the second threshold value Tth2 is an index for determining whether the switching control of the front inverter 3f has shifted from the ON state to the OFF state, and can be set to, for example, 0 [Nm] or any value larger than 0 [Nm].

In step S303, the motor controller 2 determines whether the front motor torque command value Tmf has become larger than the first threshold value Tth1 after step S302, if YES, it is determined that the switching control of the front inverter 3f is in the ON state, and the process proceeds to step S304, and if NO, step S303 is maintained.

In step S304, the motor controller 2 calculates the torque fluctuation amount ΔT for offsetting a torque discontinuity generated in a short time from when the front motor torque command value Tmf is larger than the first threshold value to when the front motor torque Tf of the front drive motor 4f is zero.

The torque fluctuation amount ΔT is calculated as a difference between a characteristic line Tf1 and a characteristic line Tf2 by using a map illustrated in FIG. 5 and using the rotation speed of the front drive motor 4f as an input value. Here, the characteristic line Tf1 is treated as the front motor torque Tf when the front drive motor 4f is switched from the driven state to the driving state, that is, when the front motor torque command value Tmf is larger than the first threshold value Tth1 (for example, zero). In addition, the characteristic line Tf2 is treated as the front motor torque Tf (for example, Tf=0) when the torque discontinuity is completed.

The torque fluctuation amount is set such that the torque discontinuity can be offset while considering the current responsiveness and mechanical inertia (mechanical responsiveness) of the front drive motor 4f and the rear drive motor 4r. For example, if the front drive motor 4f and the rear drive motor 4r have the same current responsiveness and the same mechanical inertia (mechanical responsiveness), the torque discontinuity can be offset by setting the magnitude of the torque change amount to the same magnitude of the torque discontinuity.

In step S305, the motor controller 2 corrects the value of the rear motor torque command value Tmr from [Tmr] to [Tmr−ΔT]. Accordingly, the value of the rear motor torque command value Tmr instantaneously changes from [Tmr] to [Tmr−ΔT].

In step S306, the motor controller 2 monotonically increases the value of the rear motor torque command value Tmr from [Tmr−ΔT] to [Tmr] (a value before the correction) at a speed that can be followed by, for example, the rear motor torque Tr of the rear drive motor 4r.

In step S307, the motor controller 2 determines whether the front motor torque command value Tmf is equal to or less than the second threshold value Th2 after step S301 or step S302, if YES, it is determined that the switching control of the front inverter 3f is in the OFF state, and the process proceeds to step S308, and if NO, step S307 is maintained.

In step S308, the motor controller 2 calculates the torque fluctuation amount ΔT for offsetting a torque discontinuity generated in a short time when the front drive motor 4f shifts from the driving state to the driven state, that is, from when the front motor torque command value Tmf is the second threshold value Tth2 (for example, zero) to when the front motor torque Tf of the front drive motor 4f is a torque value in the driven state.

As described above, the torque fluctuation amount ΔT is calculated as the difference between the characteristic line Tf1 and the characteristic line Tf2 by using the map illustrated in FIG. 5 and using the rotation speed of the front drive motor 4f as an input value. Here, the characteristic line Tf1 is treated as the front motor torque Tf when the torque discontinuity is completed and the front drive motor 4f is completely in the driven state, and the characteristic line Tf2 is treated as the front motor torque Tf (for example, Tf=0) of the front drive motor 4f when the front motor torque command value Tmf is the second threshold value Tth2 (for example, zero).

In step S309, the motor controller 2 corrects the value of the rear motor torque command value Tmr from [Tmr] to [Tmr+ΔT]. Accordingly, the value of the rear motor torque command value Tmr instantaneously changes from [Tmr] to [Tmr+ΔT].

<Time Chart when Switching Control is Switched from OFF State to ON State>

Figure 6:
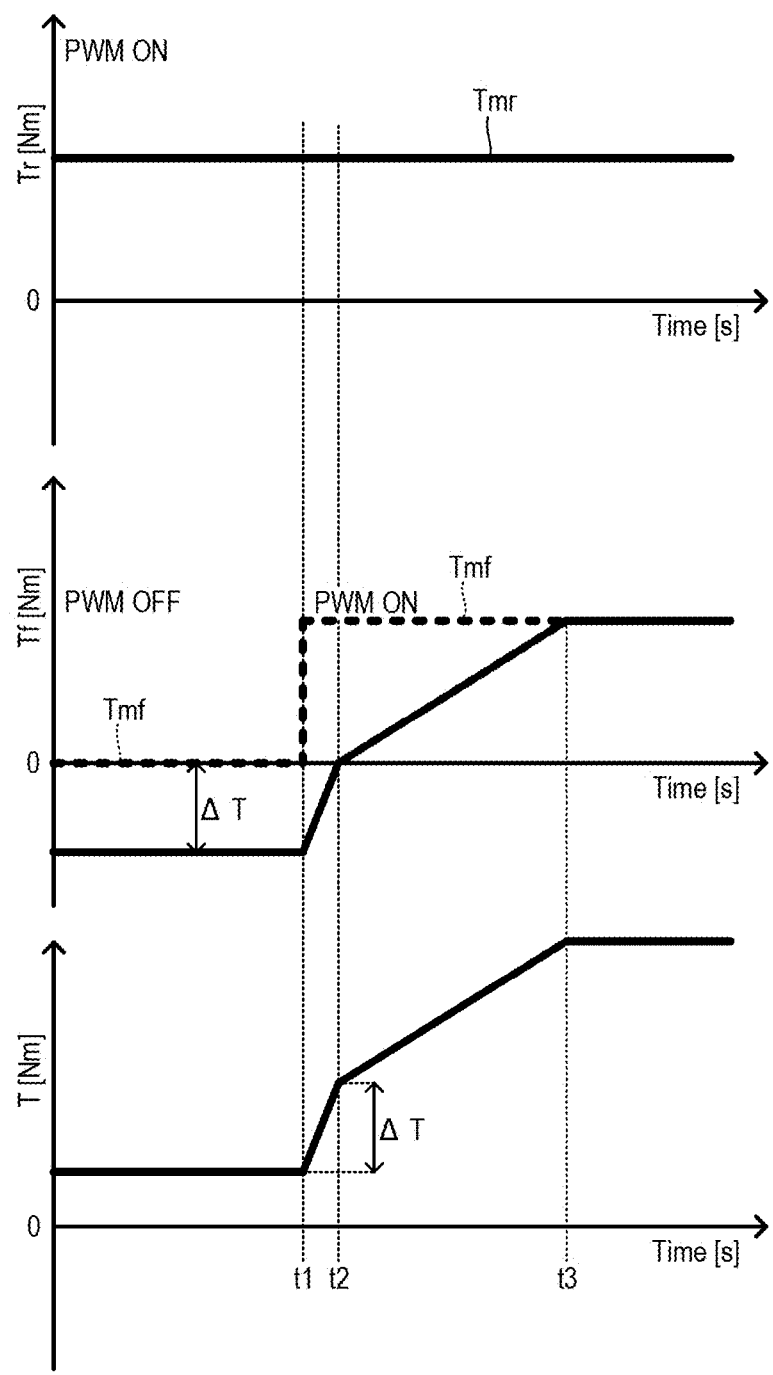
FIG. 6 illustrates time charts of a rear motor torque, a front motor torque, and a total torque when switching control of a front inverter is switched from an OFF state to an ON state and torque control is performed without considering generation of a torque discontinuity.

FIG. 6 illustrates time charts of the rear motor torque Tr, the front motor torque Tf, and the total torque T when the switching control of the front inverter 3f is switched from the OFF state to the ON state and torque control is performed without considering the generation of the torque discontinuity.

Figure 7:
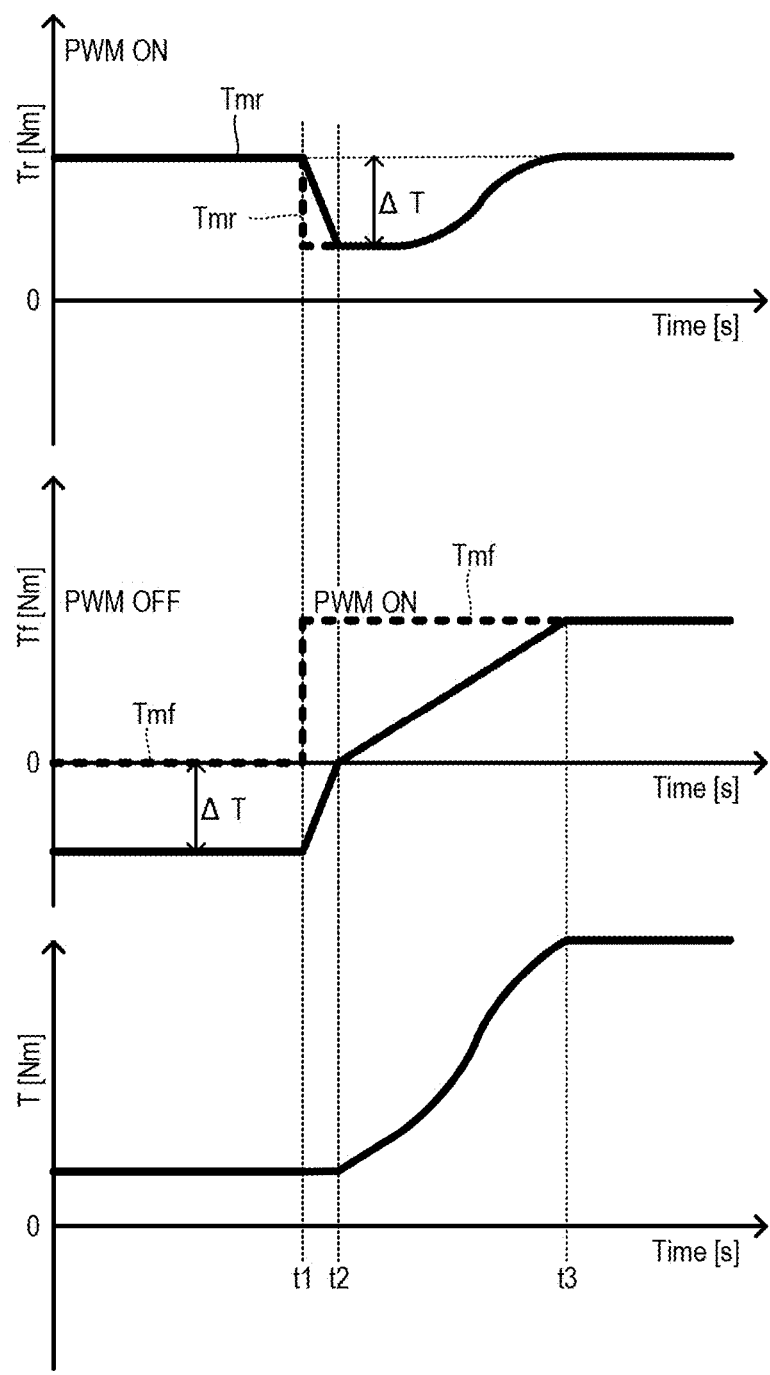
FIG. 7 illustrates time charts of the rear motor torque, the front motor torque, and the total torque when the switching control of the front inverter is switched from the OFF state to the ON state and the torque control (part 1) is performed considering the generation of the torque discontinuity.

FIG. 7 illustrates time charts of the rear motor torque Tr, the front motor torque Tf, and the total torque T when the switching control of the front inverter 3f is switched from the OFF state to the ON state and the torque control (part 1) is performed considering the generation of the torque discontinuity.

Figure 8:
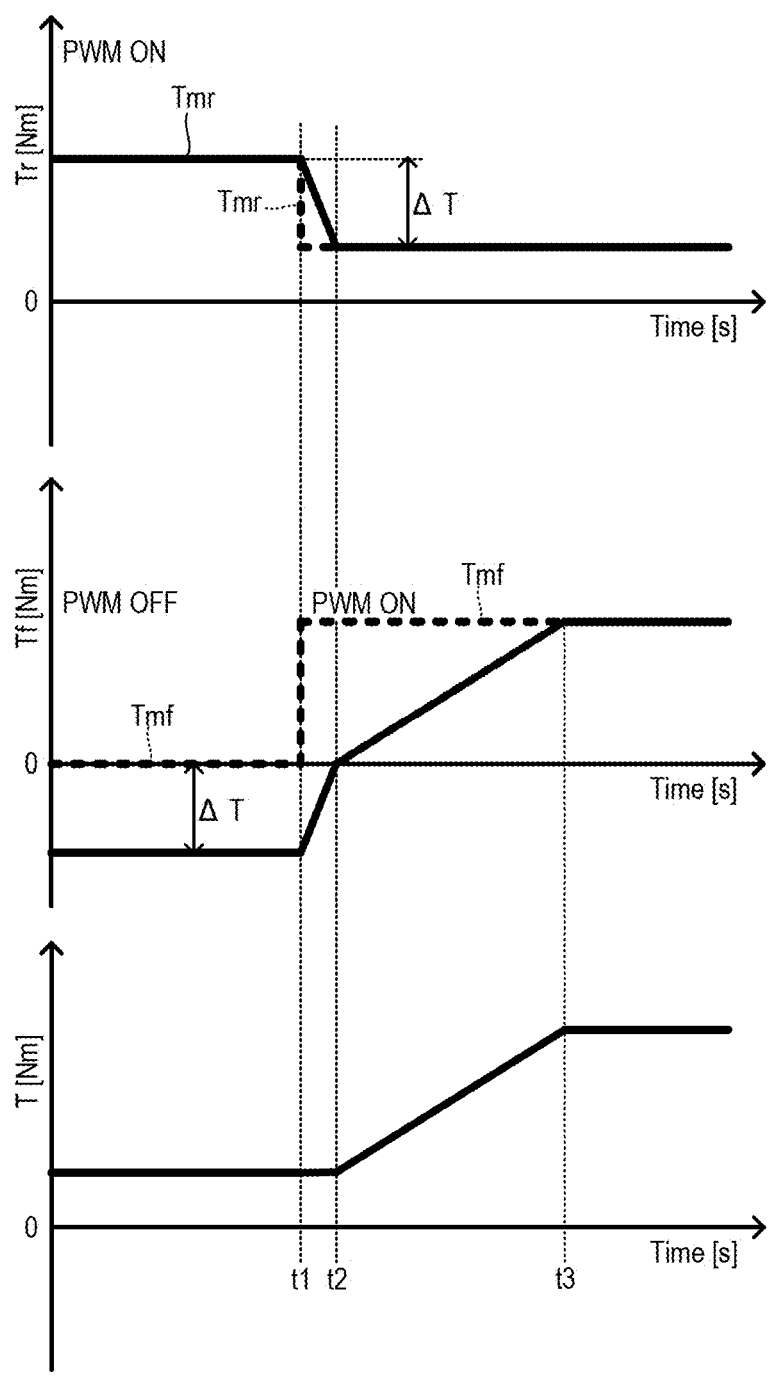
FIG. 8 illustrates time charts of the rear motor torque, the front motor torque, and the total torque when the torque control (part 2) is performed considering the torque discontinuity generated when the switching control of the front inverter is switched from the OFF state to the ON state.

FIG. 8 illustrates time charts of the rear motor torque Tr, the front motor torque Tf, and the total torque T when the torque control (part 2) is performed considering the torque discontinuity generated when the switching control of the front inverter 3f is switched from the OFF state to the ON state.

FIGS. 6 to 8 illustrate time charts in a case where the front drive motor 4f is switched from the driven state to the driving state while driving of the rear drive motor 4r is maintained.

The front motor torque Tf changes following the front motor torque command value Tmf, and the rear motor torque Tr changes following the rear motor torque command value Tmr. The total torque T is a sum of the front motor torque Tf and the rear motor torque Tr.

In FIG. 6, the rear motor torque command value Tmr is maintained at a constant value, and thus the rear motor torque Tr is also maintained at a constant value.

The front motor torque command value Tmf is maintained at zero until a time t1. Accordingly, the switching control of the front inverter 3f is in the OFF state (PWM OFF), and the front drive motor 4f is in the driven state and applies a negative torque less than 0 by ΔT to the drive system.

At the time t1, when the front motor torque command value Tmf is larger than the first threshold value Tth1 (for example, zero) and is [Tmf (t1)], the switching control of the front inverter 3f is in the ON state (PWM ON). Accordingly, the front drive motor 4f is switched from the driven state to the driving state, and a torque discontinuity is generated from the time t1 to a time t2 until the front motor torque Tf is zero.

After the time t2, the front motor torque Tf increases with a predetermined inclination based on the value [Tmf (t1)] of the front motor torque command value Tmf, and the front motor torque Tf converges to the value [Tmf (t1)] indicated by the front motor torque command value Tmf at a time t3.

On the other hand, from the time t2 to the time t3, the total torque T increases as the front motor torque Tf increases. However, from the time t1 to the time t2, the rear motor torque command value Tmr is maintained at a constant value, and thus the rear motor torque Tr is also maintained at a constant value. Therefore, from the time t1 to the time t2, the torque discontinuity generated in the front drive motor 4f is directly reflected in the total torque T, which causes an unpleasant torque shock to the driver.

On the other hand, as illustrated in FIG. 7, in the present embodiment, the motor controller 2 executes step S301 (NO) and step S302 (NO) in FIG. 4 before the time t1. Then, at the time t1, when the front motor torque command value Tmf is larger than the first threshold value Tth1 (for example, zero) and is [Tmf (t1)] (step S303 in FIG. 4), the motor controller 2 calculates the torque fluctuation amount (ΔT) (step S304 in FIG. 4), and corrects the value of the rear motor torque command value Tmr from a value [Tmr (<t1)] before time the t1 to a value [Tmr (t1)=Tmr (<t1)−ΔT] at the time t1 (step S305).

Accordingly, the value of the rear motor torque Tr changes from [Tr (t1)] to [Tr (t2)=Tr (t1)−ΔT] with a predetermined inclination from the time t1 to the time t2, and converges to the value [Tmr (t1)] of the corrected rear motor torque command value Tmr.

Therefore, from the time t1 to the time t2, the torque discontinuity generated by the front drive motor 4f is offset by the torque fluctuation amount generated by the corrected rear motor torque command value Tmr ([Tmr (t1)]) input to the rear inverter 3r, the torque discontinuity generated by the total torque T is eliminated, and a substantially constant value can be maintained.

After the time t2, the motor controller 2 gradually increases the value of the rear motor torque command value Tmr from [Tmr (t1)] to [Tmr (t1)+ΔT] (step S306 in FIG. 4), thereby gradually increasing the rear motor torque Tr.

Accordingly, the total torque T also gradually increases and converges to the total value of [Tmr (t1)+ΔT] and [Tmf (t1)] near the time t3.

The time chart in FIG. 8 is similar to the time chart in FIG. 7, but illustrates a case where step S306 in FIG. 4 is not executed. As can be seen from FIGS. 7 and 8, in the present embodiment, by executing at least step S303, step S304, and step S305, it is possible to eliminate the torque discontinuity generated when the front drive motor 4f is switched from the driven state to the driving state.

<Time Chart when Switching Control is Switched from ON State to OFF State>

Figure 9:
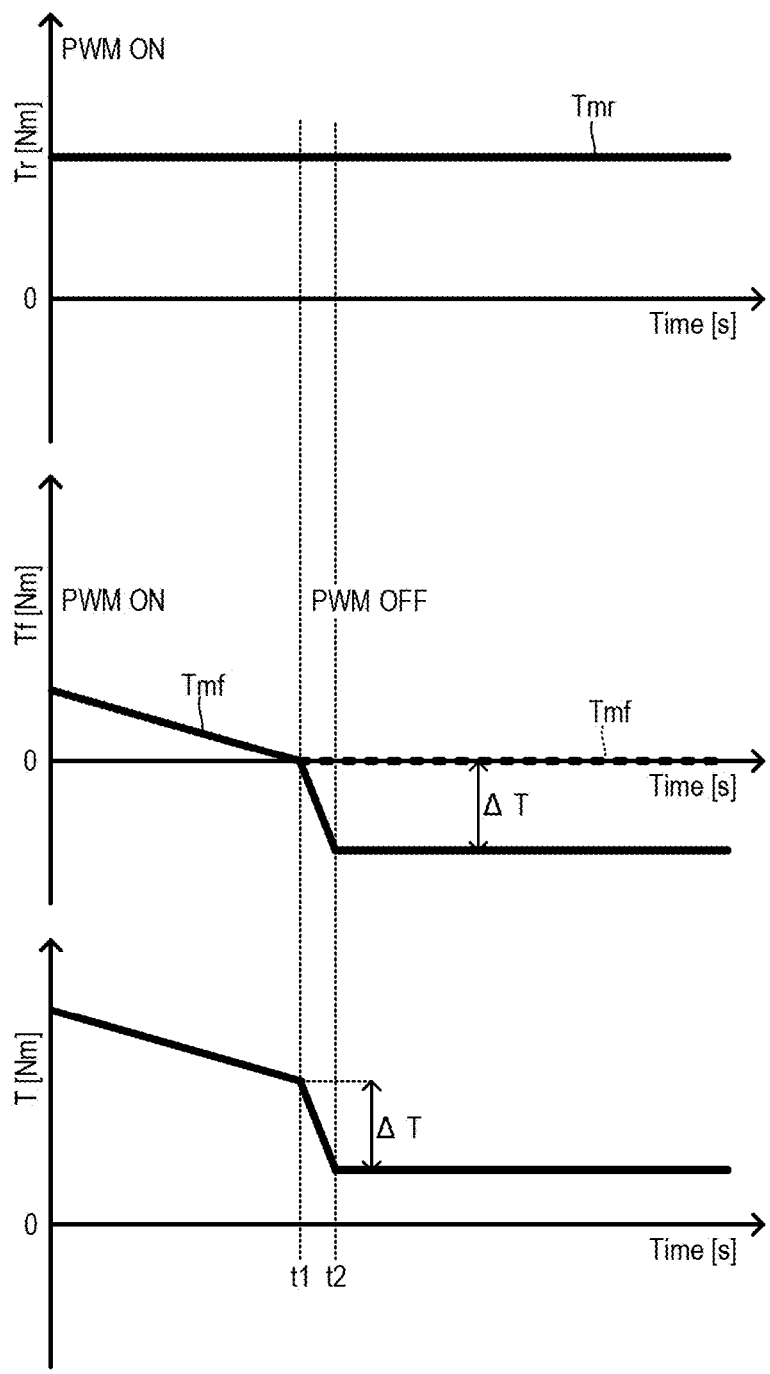
FIG. 9 illustrates time charts of the rear motor torque, the front motor torque, and the total torque when the torque control is performed without considering the torque discontinuity generated when the switching control of the front inverter is switched from the ON state to the OFF state.

FIG. 9 illustrates time charts of the rear motor torque Tr, the front motor torque Tf, and the total torque T when the torque control is performed considering the torque discontinuity generated when the switching control of the front inverter 3f is switched from the ON state to the OFF state.

Figure 10:
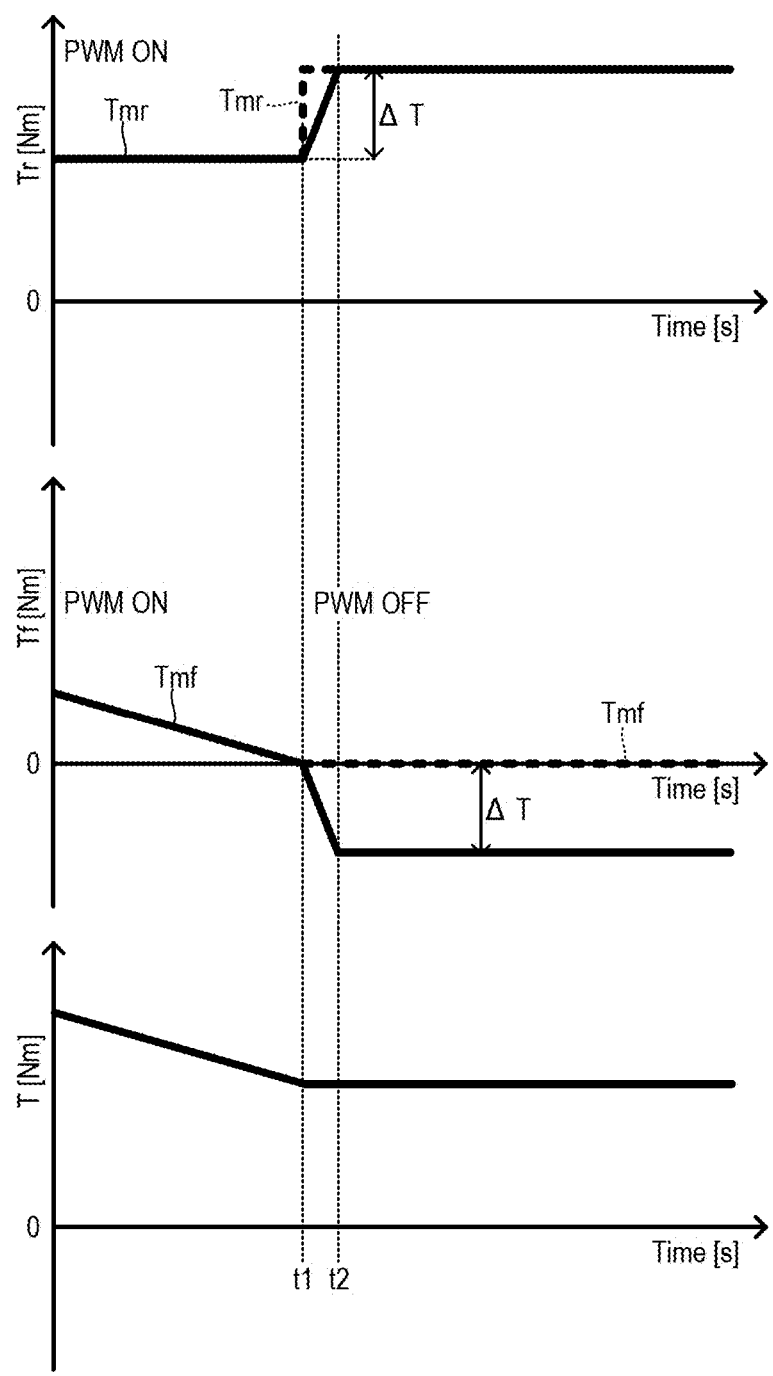
FIG. 10 illustrates time charts of the rear motor torque, the front motor torque, and the total torque when the torque control is performed considering the torque discontinuity generated when the switching control of the front inverter is switched from the ON state to the OFF state.

FIG. 10 illustrates time charts of the rear motor torque Tr, the front motor torque Tf, and the total torque T when the torque control is performed without considering the torque discontinuity generated when the switching control of the front inverter 3f is switched from the ON state to the OFF state.

FIGS. 9 and 10 illustrate time charts in a case where the front drive motor 4f is switched from the driving state to the driven state while the driving of the rear drive motor 4r is maintained.

In FIG. 9, the rear motor torque command value Tmr is maintained at a constant value, and thus the rear motor torque Tr is also maintained at a constant value.

The front motor torque command value Tmf and the front motor torque Tf monotonously decrease before the time t1, but maintain values larger than zero. Accordingly, the switching control of the front inverter 3f is in the ON state (PWM ON) before the time t1, and the front drive motor 4f is in the driving state and applies a positive torque to the drive system.

In addition, the total torque T is affected by the front motor torque Tf and monotonically decreases until the time t1.

At the time t1, when the front motor torque command value Tmf and the front motor torque Tf are zero, the switching control of the front inverter 3f is in the OFF state (PWM OFF), the driving of the front drive motor 4f is stopped and is in the driven state, a negative torque starts to be applied to the drive system. After the time t2, the front motor torque Tf applies a negative torque that is less than zero by ΔT to the drive system. Therefore, from the time t1 to the time t2, the front drive motor 4f generates a torque discontinuity (ΔT).

On the other hand, the rear motor torque command value Tmr maintains at a constant value from the time t1 to the time t2. Therefore, the total torque T rapidly decreases due to the torque discontinuity from the time t1 to the time t2, which causes an unpleasant torque shock to the driver. In addition, after the time t2, a value less than the value at the time t1 by ΔT is maintained.

As illustrated in FIG. 10, in the present embodiment, the motor controller 2 executes step S301 (YES) before the time t1. Then, at the time t1, when the front motor torque command value Tmf is the value [Tmf (t1)] equal to or less than the second threshold value Tth2 (for example, zero) (step S307 in FIG. 4), the motor controller 2 calculates the torque fluctuation amount (ΔT) (step S308 in FIG. 4), and corrects the value of the rear motor torque command value Tmr from the value [Tmr (<t1)] before the time t1 to a value [Tmr (t1)=Tmr (<t1)+ΔT] at the time t1 (step S309).

Accordingly, the value of the rear motor torque Tr changes from [Tr (t1)] to [Tr (t2)=Tr (t1)+ΔT] with a predetermined inclination from the time t1 to the time t2, and converges to the value [Tmr (t1)] of the corrected rear motor torque command value Tmr.

Therefore, from the time t1 to the time t2, the torque discontinuity generated by the front drive motor 4f is offset by the torque fluctuation amount generated by the corrected rear motor torque command value Tmr ([Tmr (t1)]) input to the rear inverter 3r, the torque discontinuity generated by the total torque T is eliminated, and a substantially constant value can be maintained.

Therefore, as can be seen from FIG. 10, in the present embodiment, by executing at least step S307, step S308, and step S309, it is possible to eliminate the torque discontinuity generated when the front drive motor 4f is switched from the driving state to the driven state.

EFFECTS OF PRESENT EMBODIMENT

According to the electric vehicle control method according to the present embodiment, a first motor (the rear drive motor 4r) and a second motor (the front drive motor 4f) are used as travel drive sources, a first torque command value (the rear motor torque command value Tmr) is transmitted to a first inverter (the rear inverter 3r) to perform drive control (the switching control) of the first motor (the rear drive motor 4r), and a second torque command value (the front motor torque command value Tmf) is transmitted to a second inverter (the front inverter 3f) to perform drive control (the switching control) of the second motor (the front drive motor 4f); and switching control of switching the drive control (the switching control) on the second motor (the front drive motor 4f) by the second inverter (the front inverter 3f) between an ON state in which the drive control (the switching control) is performed and an OFF state in which the drive control (the switching control) is stopped is performed based on a required drive force. In the electric vehicle control method, a torque fluctuation amount (for offsetting a torque discontinuity) generated in the second motor (the front drive motor 4f) during the switching control is calculated based on a rotation speed of the second motor (the front drive motor 4f), and the first torque command value (the rear motor torque command value Tmr) is corrected based on the torque fluctuation amount.

According to the above-mentioned method, the torque discontinuity appearing in a response (the total torque T) of the entire drive system during the switching control of the second inverter (the front inverter 3f) can be offset by the first torque command value (the rear motor torque command value Tmr) corrected by the torque fluctuation amount (the torque discontinuity). Therefore, the drive control for the second motor (the front drive motor 4f) and the control for stopping the drive control can be executed without giving a driver an uncomfortable torque shock caused by the torque discontinuity.

In the present embodiment, the second motor (the front drive motor 4f) is a winding field type motor, and in a case where the second inverter (the front inverter 3f) switches the drive control (the switching control) to the ON state when the second torque command value (the front motor torque command value Tmf) is larger than a first threshold value (Tth1), and switches the drive control (the switching control) to the OFF state when the second torque command value (the front motor torque command value Tmf) is smaller than a second threshold value (Tth2), the torque fluctuation amount (the torque discontinuity) is calculated when the second torque command value (the front motor torque command value Tmf) is larger than the first threshold value (Tth1) or when the second torque command value (the front motor torque command value Tmf) is smaller than the second threshold value (Tth2).

Accordingly, the motor controller 2 can calculate, without confirming the switching of the second inverter (the front inverter 3f) to the ON state or the OFF state, the torque fluctuation amount (the torque discontinuity) at a timing at which the second inverter (the rear inverter 3r) performs the switching control, and can reduce an error in the torque fluctuation amount due to a deviation of the timing.

In the present embodiment, the first torque command value (the rear motor torque command value Tmr) is corrected based on the torque fluctuation amount when the second torque command value (the front motor torque command value Tmf) is larger than the first threshold value (Tth1) or when the second torque command value (the front motor torque command value Tmf) is smaller than the second threshold value (Tth2).

Accordingly, the torque discontinuity can be reliably offset by the corrected first torque command value (the rear motor torque command value Tmr) without deviating the timing.

In addition, according to the electric vehicle control system according to the present embodiment, there is provided a first motor (the rear drive motor 4r) and a second motor (the front drive motor 4f) serving as travel drive sources; a first inverter (the rear inverter 3r) that performs drive control (the switching control) on the first motor (the rear drive motor 4r); a second inverter (the front inverter 3f) that performs drive control on the second motor (the front drive motor 4f); and a control unit (the motor controller 2) that transmits a first torque command value (the rear motor torque command value Tmr) to the first inverter (the rear inverter 3r) and transmits a second torque command value (the front motor torque command value Tmf) to the second inverter (the front inverter 3f). In the electric vehicle control method, switching control of switching the drive control (the switching control) on the second motor (the rear drive motor 4r) by the second inverter (the rear inverter 3r) between an ON state in which the drive control (the switching control) is performed and an OFF state in which the drive control (the switching control) is stopped is performed based on a required drive force, and the control unit (the motor controller 2) calculates a torque fluctuation amount (for offsetting the torque discontinuity) generated in the second motor (the front drive motor 4f) during the switching control based on a rotation speed of the second motor (the front drive motor 4f), and corrects the first torque command value (the rear motor torque command value Tmr) based on the torque fluctuation amount.

According to the above-mentioned configuration, the torque discontinuity appearing in a response (the total torque T) of the entire drive system during the switching control of the second inverter (the front inverter 3f) can be offset by the first torque command value (the rear motor torque command value Tmr) corrected by the torque fluctuation amount (the torque discontinuity). Therefore, the drive control for the second motor (the front drive motor 4f) and the control for stopping the drive control can be executed without giving a driver an uncomfortable torque shock caused by the torque discontinuity.

Although the embodiment of the present invention has been described above, the configurations described in the above-mentioned embodiment and modifications are merely examples of applications of the present invention, and are not intended to limit the technical scope of the present invention.

For example, in the present embodiment, the switching control of switching the drive control (the switching control) by the second inverter (the front inverter 3f) that performs the drive control on the second motor (the front drive motor 4f) between the ON state in which the drive control (the switching control) is performed and the OFF state in which the drive control (the switching control) is stopped. Alternatively, the first inverter (the rear inverter 3r) that performs the drive control on the first motor (the rear drive motor 4r) may perform the switching control.

In this case, during traveling, the drive control (the switching control) of the second inverter (the front inverter 3f) is always in the ON state, the torque fluctuation amount (the torque discontinuity) generated in the first motor (the rear drive motor 4r) is calculated by the switching control, and the second torque command value (the front motor torque command value Tmf) is corrected based on the torque fluctuation amount.

In addition, in the above-mentioned embodiment and modifications, "right" and "left" are merely directions used for convenience of description, and are not intended to strictly coincide with the left and right directions with respect to the front of the vehicle body.

The invention claimed is:

1. An electric vehicle control method comprising:
   using a first motor configured to drive a first driving wheel and a second motor configured to drive a second driving wheel, performing mode switching control switching between a first mode in which only the first motor operates and a second mode in which the first motor and the second motor operate based on input of a driver, performing drive control on the first motor by transmitting a first torque command value to a first inverter, and performing drive control on the second motor by transmitting a second torque command value to a second inverter; and
   performing switching control of switching, based on the mode switching control, the drive control on the second motor by the second inverter between an ON state in which the drive control is performed and an OFF state in which the drive control is stopped, wherein
   a torque fluctuation amount generated in the second motor during the switching control is calculated based on a rotation speed of the second motor, and
   the first torque command value is corrected based on the torque fluctuation amount.

2. The electric vehicle control method according to claim 1, wherein
   the second motor is a winding field type motor, and
   in a case where the second inverter switches the drive control to the ON state when the second torque command value is larger than a first threshold value, and switches the drive control to the OFF state when the second torque command value is smaller than a second threshold value,
   the torque fluctuation amount is calculated when the second torque command value is larger than the first threshold value or when the second torque command value is smaller than the second threshold value.

3. The electric vehicle control method according to claim 2, wherein
   the first torque command value is corrected based on the torque fluctuation amount when the second torque command value is larger than the first threshold value or when the second torque command value is smaller than the second threshold value.

4. The electric vehicle control method according to claim 1, wherein the first driving wheel is a front wheel.

5. The electric vehicle control method according to claim 1, wherein the second driving wheel is a rear wheel.

6. An electric vehicle control system comprising:
   a first motor configured to drive a first driving wheel and a second motor configured to drive a second driving wheel;
   a first inverter configured to perform drive control on the first motor;
   a second inverter configured to perform drive control on the second motor; and
   a motor controller configured to transmit a first torque command value to the first inverter and transmit a second torque command value to the second inverter, wherein
   switching control of switching the drive control on the second motor by the second inverter between an ON state in which the drive control is performed and an OFF state in which the drive control is stopped is performed based on a mode switching control, and
   the motor controller is configured to calculate a torque fluctuation amount generated in the second motor during the switching control based on a rotation speed of the second motor, and correct the first torque command value based on the torque fluctuation amount.

7. The electric vehicle control system according to claim 6, wherein the first driving wheel is a front wheel.

8. The electric vehicle control system according to claim 6, wherein the second driving wheel is a rear wheel.

* * * * *